July 19, 1955

A. WOLF 2,713,343

DEMOUNTABLE DRIVE SHAFT SUPPORT FOR SHAKERS AND
SIEVES IN THRESHING AND CLEANING APPARATUS

Filed Feb. 2, 1953

Inventor:
ALFRED WOLF by
Henderoth, Lind & Ponack
Attorneys

United States Patent Office 2,713,343
Patented July 19, 1955

2,713,343

DEMOUNTABLE DRIVE SHAFT SUPPORT FOR SHAKERS AND SIEVES IN THRESHING AND CLEANING APPARATUS

Alfred Wolf, Gottmadingen, Kreis Konstanz, Germany, assignor to Maschinenfabrik Fahr A. G., Gottmadingen, Kreis Konstanz, Germany Application February 2, 1953, Serial No. 334,493

Claims priority, application Germany February 18, 1952

1 Claim. (Cl. 130—24)

The arrangement hitherto employed for supporting the drive shafts for shakers and sieves of threshing machines presents many disadvantages, especially with combined mowing and threshing machines, as in case of disturbances the removal of the bearings for repair purposes entails some difficulties and requires considerable time. It is an object of the invention to make possible, with simplest means, a quick removal of the drive shaft, as well as of the shaker and of the sieve box. This is not only of advantage in the final assembly of the machine during production, but still more so when unexpected disturbances are being encountered during operation of the machine, which have to be eliminated within the shortest possible time. According to the invention, these advantages are obtained by a special construction of the drive shaft and by the way of supporting it, as hereinafter described.

Figure 1:
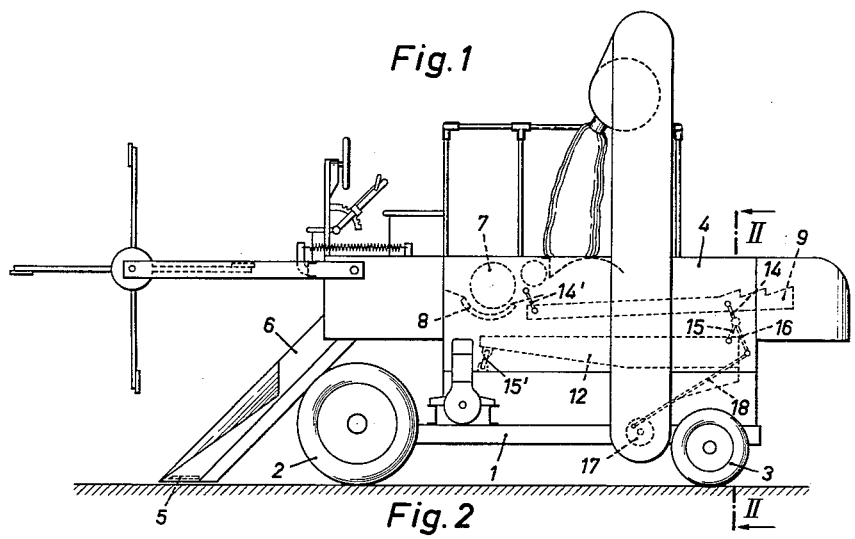
Figure 2:
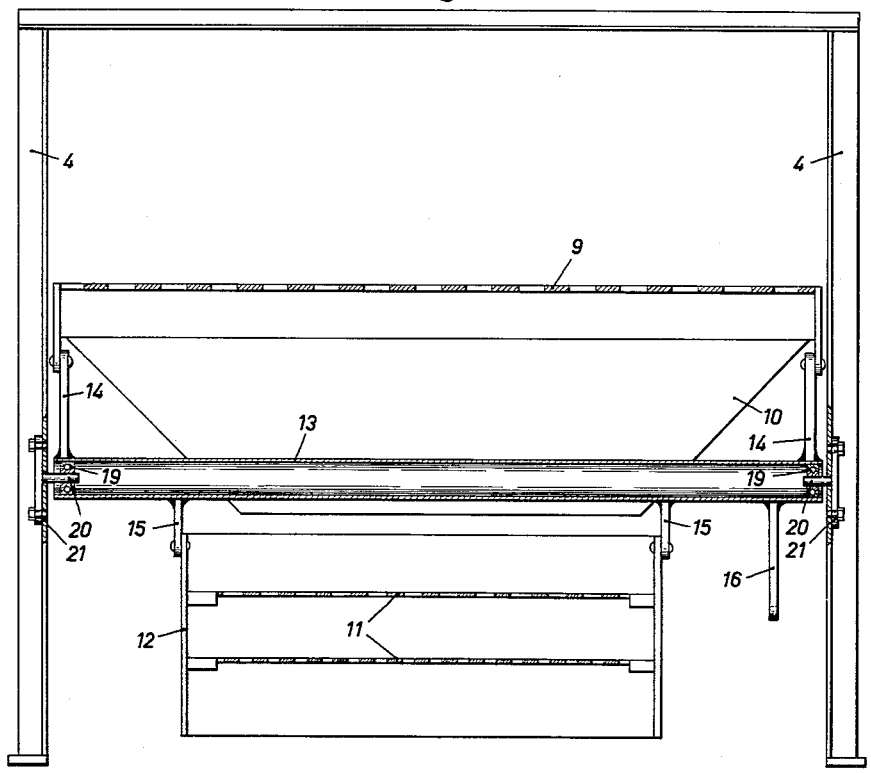

As an embodiment of the invention the arrangement for supporting the drive shaft for the cleaning sieves of the threshing mechanism of a combined mowing and threshing machine is shown, by way of example only, in the accompanying drawing, in which:

Fig. 1 is a side elevation of a combined mowing and threshing machine in diagrammatic view, and Fig. 2 is a sectional view taken on line II—II of Fig. 1 through the drive shaft for the shaker and the cleaning sieve box.

On the supporting frame 1 on which are supported the driving wheels 2 at the front and the steering wheels 3 at the rear, is mounted the threshing box 4 containing the usual threshing and cleaning devices. On the front side of the supporting frame 1 is provided the mowing mechanism 5 and adjoining thereto the conveying mechanism 6 feeding the cut stalks to the threshing apparatus 7, 8, from where the threshed straw is being carried to the rear across the sieve-like shakers 9 and leaves the machine at the shaker end. The grains having been threshed out and their admixtures fall into a chute 10 and from there into the sieve box 12 carrying the cleaning sieves 11, the shakers and the cleaning apparatus being suspended in the usual manner on rocking levers 14, 14' and 15, 15' respectively. Movement is imparted to these parts by means of a shaft 13 which in the arrangement described is formed by a tube, to which are welded the lever arms 14 for driving the shaker 9, the lever arms 15 for driving the sieve box 12, and a lever arm 16 for driving the shaft 13. Oscillating movement is imparted to the lever arm 16 by a crank disc 17 via a push rod 18.

The length of the hollow shaft 13 is slightly inferior to the inside width of the threshing box. A plain bearing or anti-friction bearing 19 is installed in each end of the hollow shaft. The corresponding journals 20 are, however, provided on carrier plates 21 which are detachably mounted on the outside of the threshing box, and are thus easily accessible. For removing the shaft 13 it is therefore only necessary to unscrew and remove the carrier plates 21, and to disconnect the various driving and rocking levers from the parts to which they are attached. After removing the shaft, the shaker and the sieve box are conveniently accessible and may easily be withdrawn at the rear of the machine. Just as quickly these parts and their drive shaft may then be reinstalled in reverse sequence.

It is to be noted that the construction of the drive shaft and the arrangement for supporting it, as described above, are of course not applicable only to combined mowing and threshing machines, but may also be applied to the usual types of threshing apparatus, without departing from the scope of the invention.

I claim:

An easily removable drive shaft assembly for a threshing machine having a frame, a reciprocating sieve and a reciprocating shaker, and a crank disc and push rod to oscillate said drive shaft assembly, comprising a hollow drive shaft positioned between the sides of said frame having a lever arm connected to said push rod, a pair of lever arms connected to said reciprocating sieve and a pair of lever arms connected to said shaker, bearing means attached to the interior of the ends of said hollow drive shaft, a pair of journals inserted one in each bearing and projecting from the ends of said shaft through the sides of said frame, a pair of carrier plates rigidly attached one to each journal, and means for detachably attaching said carrier plates to said frame.

References Cited in the file of this patent

UNITED STATES PATENTS

| | | |
|---|---|---|
| 765,702 | Davies | July 26, 1904 |
| 1,486,758 | Jerram | Mar. 11, 1924 |
| 1,708,286 | Turner | Apr. 9, 1929 |
| 2,388,165 | Loewe et al. | Oct. 30, 1945 |